H. L. WELLS.
BLANK FOR PERIODICAL SUBSCRIPTIONS.
APPLICATION FILED JUNE 2, 1921.

1,393,865.

Patented Oct. 18, 1921.

UNITED STATES PATENT OFFICE.

HARRY L. WELLS, OF CHICAGO, ILLINOIS.

BLANK FOR PERIODICAL SUBSCRIPTIONS.

1,393,865.     Specification of Letters Patent.     Patented Oct. 18, 1921.

Application filed June 2, 1921. Serial No. 474,556.

*To all whom it may concern:*

Be it known that I, HARRY L. WELLS, a citizen of the United States, and a resident of the city of Chicago, in the county of Cook and State of Illinois, have invented certain new and useful Improvements in Blanks for Periodical Subscriptions; and I do hereby declare that the following is a full, clear, and exact description of the same, reference being had to the accompanying drawings, and to the numerals of reference marked thereon, which form a part of this specification.

This invention relates to a blank such as would be used by agents in obtaining subscriptions to magazines.

It is an object of this invention to provide a blank of the class described which shall afford a convenient means of recording the subscriptions obtained by the agent.

It is a further object of the invention to combine in one blank a postal card for sending the order to the magazine, a coupon good for a further subscription, and a stub for the agent's records.

It is a further object of this invention to have a coupon upon the mailing card used for subscription blanks which coupon is so worded that it will both serve as a receipt and possess a monetary value.

Other and further important objects of the invention will be apparent from the disclosures in the specification and drawings.

The invention (in a preferred form) is illustrated on the drawings and hereinafter more fully described.

On the drawings:

Figure 1 is a view of the front side of the blank.

Fig. 2 is a view of the other side of the blank.

Fig. 3 is a view of the front side of a modification.

As shown on the drawings:

The blank consists of a postal card portion 1, a receipt 2 and a stub portion 3 separated by lines of perforations or other weakened places in the card indicated at 4 and 5. The post card portion 1 contains the name of the magazine printed at 6. This may be in large type or in conspicuously colored ink or in any other way be rendered prominent. Immediately above it a line of lettering 7 stating the length of subscription which will be ordered by means of the postal card. At 8 there is a statement of the terms of the contract. This is followed by designated blanks for the name and address of the subscriber as shown at 9 and 10. If desired this may be followed at 11 by a further statement of the terms of the contract, as for example by a statement of limitations for the use of the card as shown at 11. At the bottom of the card at 12 is a designated place for the signature of the subscription agent and at 13 a place properly designated for the date. Other spaces upon the card may be used for advertising the nature and qualities of the magazine.

Adjacent the line of perforations 4 between this card and the receipt portion 2 are printed directions for the subscriber to fill out and mail the card but to retain the receipt portion, as indicated at 14. These directions may be upon either side of the perforations 4, that is, they may be either upon the card or upon the receipt portion.

The receipt portion 2 contains in conspicuous letters as at 15 a statement that it is of value. In less conspicuous lettering this coupon contains a detailed statement of the use to which it may be put. This may be a statement that it will be redeemed by the publishers of the magazine or a statement that it may be used for partial payment upon a renewal order or any other statement that will induce the subscriber to insist upon receiving the coupon with the postal card when he pays the agent. Such a statement of conditions is indicated at 16. Below this statement is printed or written the signature of the party responsible for it as indicated at 17, or if there be two parties, such as a subscription soliciting concern and the publishers of the magazine, each of whom assumes responsibility for the statement, both of these names may be written or printed upon the coupon. This is indicated at 17 and 18. The coupon also contains a blank suitably designated for receiving a date as indicated at 19. Preferably this date is that at which the period of the subscription covered by the postal card expires, or the date at which the order is secured by the solicitor.

Adjacent the line of perforations 5 are printed directions 20 for the agent to detach the card and receipt and give the same to the subscriber. These directions may be printed either upon the stub 5 or on the other side of the line of perforations.

The stub 3 is intended for the agent's record. It contains at 21 a statement that it must be delivered to the employer of the agent. At 22 it has a space suitably designated for the date. At 23 there is a statement of the business which the stub represents. This statement contains at 24 the name of the magazine to which the agent has secured a subscription. Preferably this name is printed in a distinctive way. Below this at 25 is a place for the name of the subscriber and at 26 suitably designated blanks for his address. Below this at 27 follows a memorandum stating what the salesman has done with the other portions of the blank. At the bottom of the stub is a suitably designated space 28 for the signature of the salesman.

The postal card, receipt portion and stub each bear a serial number or other identifying mark which is the same upon all three of them as indicated at 29, 30 and 31 respectively.

Upon the other face of the blank the postal card portion 1 bears the usual designation 32 to indicate that it is a postal card, and in the place usually occupied by the address it has the name and address of the concern soliciting subscriptions as shown at 33. It also has at 34 the usual indication of a place for the postage stamp.

This face of the receipt portion 2 contains at 35 directions to the subscriber to keep the stub and also directions that he write his name and address upon the postal card before mailing the same. It contains at 36 an acknowledgment that the agent has received subscription money and that the subscriber is entitled to a certain number of issues of the magazine. If desired, this acknowledgment may be on a fourth portion of the blank, separated by lines of perforations or the like from the other portions. The coupon 2 contains at 38 a further statement of the conditions of the contract. This includes a statement that the concern is not responsible unless the subscriber personally fills out the postal card, and also a statement that the first issue should arrive within a specified time. At the bottom of this face of the receipt portion is printed or written the name of the concern employing the agent as indicated at 39. The same face of the record or stub portion 3 contains the name and address of the concern employing the agent as shown at 40.

In the modification shown in Fig. 3 the same printed matter is used upon each of the three portions but the receipt portion instead of being between the postal card and stub is placed at the other end of the postal card. Thus the postal card is shown at 1ª and is separated by perforations 41 from the receipt portion 2ª, while perforations 42 separate the postal card from the stub portion 3ª.

This device is intended to be used in a system in which a company making business of soliciting subscriptions to magazines employs a force of agents to personally solicit such subscriptions. These agents will be supplied with an assortment of such blanks, a different blank for each magazine for which he is expected to solicit subscriptions. Preferably the blanks used for any one magazine are bound together into a booklet or block by staples or similar fastenings through the stub portions as indicated at 43 in Figs. 1 and 3.

The agent takes his collection of blanks and goes among prospective subscribers soliciting subscriptions. When a subscription is obtained the agent detaches the postal card 1 and receipt 2 at the line of perforations 5 or 42. He signs and dates the postal card as indicated at 12 and 13 and dates the receipt portion as indicated at 19. Either at the same time or later in the same day he fills out the blanks upon the corresponding stub portion 3, detaches it from the book or tablet of blanks and mails it to the company which employs him.

The subscriber puts his name and address upon the postal card at the blanks indicated by 9 and 10, places a stamp thereon at 34 and detaches the card from the receipt portion and mails the card. The card is received by the company employing the agent and the order for the subscription transmitted by them to the company publishing the corresponding magazine.

When the first issue of the magazine arrives and the subscriber finds that he wishes a longer subscription than that obtained by the postal card, or when the subscription covered by the postal card has nearly expired, he may obtain a renewal of his subscription at a less rate by using the receipt portion 2 to pay a portion of the renewal subscription price. This is indicated by the matter printed upon the receipt portion. For this reason the subscriber will insist upon receiving the receipt portion along with a postal from the agent and will be very likely to return the receipt portion to the company employing the agent or send it to the publishers of the magazine who in their turn would send it to the company.

By this arrangement the agent cannot secure money for a subscription to a magaine and neglect to report the transaction to the soliciting company, because the customer will automatically do this by filling out and mailing the postal card. If the agent should then neglect or refrain from sending in a record of the order upon the stub portion 3, the arrival of the postal card having such and such a serial number will automatically bring the neglect of the agent to the attention of the soliciting company.

If the magazine pleases the subscriber sufficiently to make him renew at the end of the limited period secured through the postal card he uses the receipt blank for a part of the payment of his renewal. The company is entitled to a greater commission from the publishers of the magazine if a long subscription results from their efforts than if they secured a four months' subscription only. The arrival of the coupon in the office of the company will give them the information that they are entitled to this additional commission. This coupon may be sent by the subscriber directly to the subscription soliciting company or it may be sent to the publishers of the magazine. In the latter case the publishers will send it to the subscription soliciting company. The coupon represents a payment made to the agent and so is evidence that the subscription soliciting company should pay a certain sum to the publishers of the magazine. The publishers of the magazine will therefore see to it that the coupon is delivered to the subscription soliciting company. If the coupon comes directly to the latter, they, in order to preserve their trade, will see to it that the publishers are notified of the renewal of the subscription.

As a specific illustration: Suppose that the magazine is one whose subscription price is $3.00 per year. The agent sells to the subscriber the coupon and postal card for say $1.50. The postal card enables the subscriber to secure the magazine four months for a dollar. If at the end of this time the subscriber wishes to continue his subscription he sends his coupon and $2.50 in cash to the subscription soliciting company or to the publishers of the magazine. If the publishers receive the coupon they will enter the subscription and subsequently send the coupon to the subscription soliciting company because a portion, say 20¢ of the 50¢ which it represents, should be paid to the publishers by the subscription soliciting company. If the subscription soliciting company receive the coupon they will send it, together with the order for renewal, to the publishers of the magazine along with $2.70. Thus 30¢ of the 50¢ originally paid by the subscriber for the coupon would be retained by the subscription soliciting company. The name and address of the subscriber need not be repeated on the coupon because the serial number thereon enables the office either of the publishers or of the subscription soliciting company to identify the original postal card and obtain the address therefrom.

I am aware that numerous details of construction may be varied through a wide range without departing from the principles of this invention, and I therefore do not purpose limiting the patent granted otherwise than necessitated by the prior art.

I claim as my invention:

1. A postal card containing on the address side the name and address of a company soliciting subscriptions to periodicals and on the other side a contract of subscription to a periodical, a receipt coupon detachably connected to said postal card and bearing a contract whereby it may be used in part payment of an extension of said subscription, and a stub detachably connected to said two other parts and having suitably designated spaces for entering a record of said subscription.

2. A postal card containing on the address side the name and address of a company soliciting subscriptions to periodicals and on the other side a contract of subscription to a periodical, a receipt coupon detachably connected to said postal card and bearing a contract whereby it may be used in part payment of an extension of said subscription, and a stub detachably connected to said two other parts and having suitably designated spaces for entering a record of said subscription, said postal card and stub having suitably designated places for the signature of the agent securing the subscription and all three of said parts bearing suitably designated places for the date.

3. A postal card containing on the address side the name and address of a company soliciting subscriptions to periodicals and on the other side a contract of subscription to a periodical, a receipt coupon detachably connected to said postal card and bearing a contract whereby it may be used in part payment of an extension of said subscription, and a stub detachably connected to said two other parts and having suitably designated spaces for entering a record of said subscription, said postal card and stub having suitably designated places for the signature of the agent securing the subscription and all three of said parts bearing suitably designated places for the date, the receipt coupon contract including a statement that it will be redeemed if used within a limited period.

In testimony whereof I have hereunto subscribed my name in the presence of two subscribing witnesses.

HARRY L. WELLS.

Witnesses:
CARLTON HILL,
JAMES M. O'BRIEN.